United States Patent

[11] 3,617,524

[72] Inventor Arthur L. Conn
 Chicago, Ill.
[21] Appl. No. 836,409
[22] Filed June 25, 1969
[45] Patented Nov. 2, 1971
[73] Assignee Standard Oil Company
 Chicago, Ill.

[54] EBULLATED BED HYDROCRACKING
 4 Claims, 1 Drawing Fig.
[52] U.S. Cl. .................................................. 208/157,
 208/108
[51] Int. Cl. ............................................... C10g 13/02
[50] Field of Search ............................................ 208/10,
 143, 157, 108; 23/288.3 S

[56] References Cited
 UNITED STATES PATENTS
 3,151,060  9/1964  Garbo ........................... 208/143
 3,188,286  6/1965  Van Driesen ................. 208/143
 3,338,820  8/1967  Wolk et al. ................... 208/143
 3,441,498  4/1969  Jubin et al. ................... 208/143

Primary Examiner—Herbert Levine
Attorneys—Arthur G. Gilkes, William T. McClain and John J. Connors ABSTRACT: Disclosed is an improved H-oil process for hydrocracking a reduced crude oil or the like. The hydrocracking is conducted in a reactor containing an ebullating bed of oil, hydrogen, and hydrocracking catalyst, and a relatively high velocity oil-gas stream is injected into the reactor. Simultaneously a portion of the reacting mass within the reactor is withdrawn and reintroduced into the reactor by mixing with the stream.

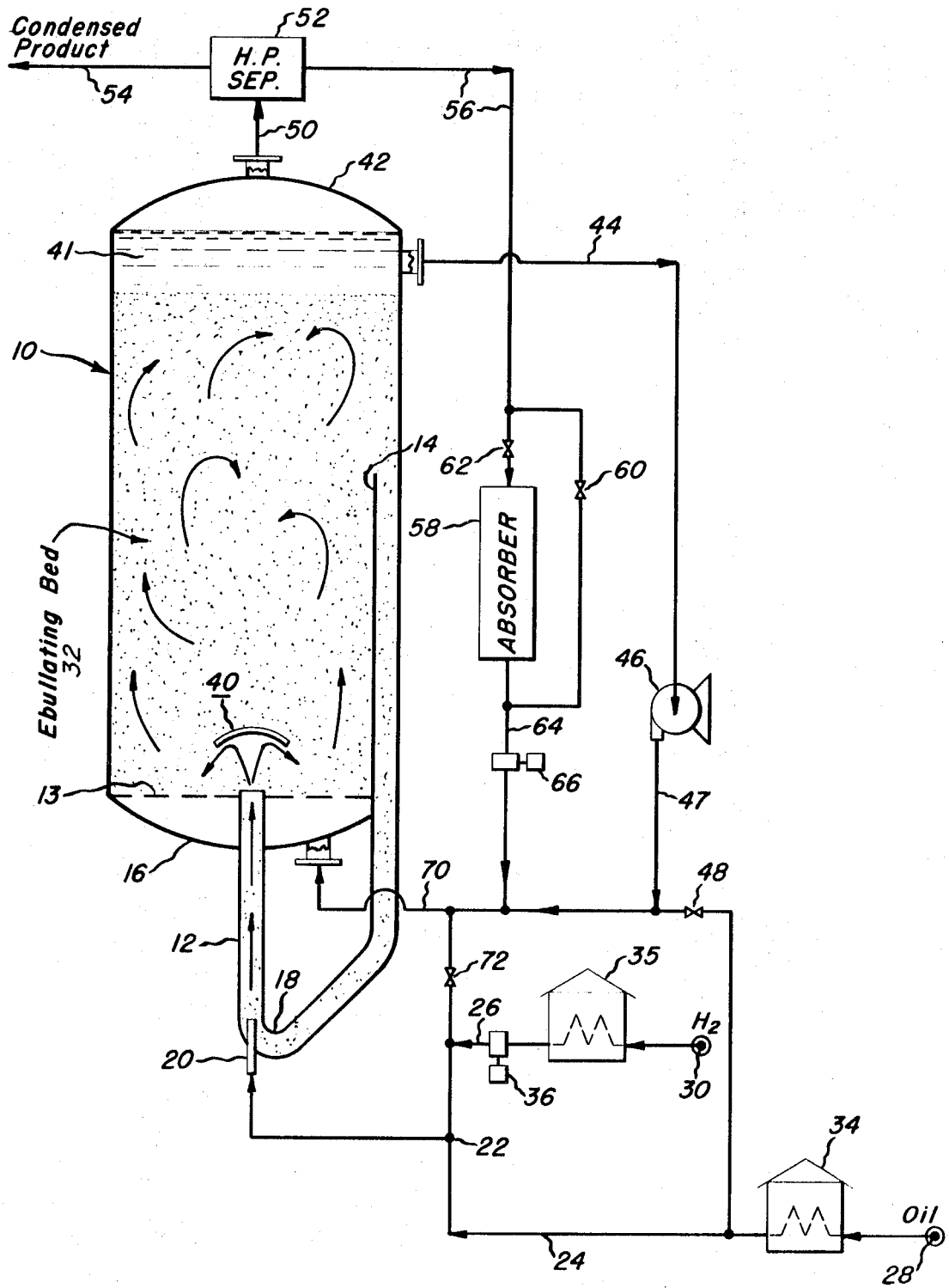

3,617,524

EBULLATED BED HYDROCRACKING

BACKGROUND OF THE INVENTION

In converting higher molecular weight hydrocarbon oils into lower molecular weight products, oil feed, hydrogen gas, and a conventional hydrocracking catalyst are brought together at well-known temperatures and pressures in an ebullating bed reactor. Because there is a tendency for the gas to coalesce into large bubbles, and because there is the tendency for the oil to form a 'stagnant film' on catalyst particles due to the relatively low velocities of the material in the ebullating bed, neither uniform nor intimate contact between the oil feed and catalyst is always attained. I have invented a method and apparatus which minimizes these problems.

BRIEF DESCRIPTION OF THE INVENTION

Broadly, my invention comprises: (i) establishing within a reaction zone an ebullating bed of hydrogen, hydrocracking catalyst, and oil feed, said bed being maintained at conditions which promote the formation of said lower molecular weight hydrocarbons; (ii) withdrawing from said zone a portion of the catalyst; (iii) mixing said withdrawn catalyst with a high-velocity stream of hydrogen and oil feed flowing into the zone; and (iv) withdrawing from said zone the lower molecular weight hydrocarbons. The velocity of the stream is preferably from about 10 to about 100 times greater than the average velocity of the material within the ebullating beds. Thus the high turbulence in the stream causes an increase in the turnover rate of oil near the catalyst. Preferably, the stream is directed into or near the lower portion of the reaction zone, and as it enters this zone it is dispersed in a manner which does not unduly disturb the ebullating bed. As catalyst mixes with this high velocity, turbulent stream, better oil-catalyst contact is achieved.

My process may be used to hydrocrack reduced crude oils, but it may also be used with other types of oil feeds. If desired, this oil feed may be preprocessed to remove organic sulfur and nitrogen compounds which may deactivate the hydrocracking catalyst. This is, however, not always necessary and depends on the type of oil feed and catalyst used. The oil-hydrogen infeed and catalyst withdrawal are controlled to keep the materials within the reactor at the proper level.

The apparatus for carrying out my process includes a vertically disposed reactor which contains the ebullating bed. Means are provided at the top of the vessel for withdrawing cracked hydrocarbon products and unused hydrogen gas and for recycling the unused hydrogen and a portion of the cracked hydrocarbon liquid to the bottom of the reactor. A tube extending into the reactor serves as the means for injecting the high-velocity oil-hydrogen stream into the ebullating bed, and a standpipe within the reactor and connected to this tube serves as means for withdrawing catalyst from the bed and feeding the catalyst into the tube. As hydrogen and oil flow through the tube, catalyst is educted into the stream and reintroduced into the ebullating bed. Baffle means at the outlet of the tube disperse the stream so that the stream does not unduly disturb the upper section of the ebullating bed.

DESCRIPTION OF THE PREFERRED EMBODIMENT

The Figure, illustrating schematically my invention, shows vertical reactor 10, which is cylindrical in shape and has vertical rise tube 12 extending upwardly along the central longitudinal axis of reactor 10 and passing through distributor plate 13. Standpipe 14, at one side of reactor 10, protrudes from the bottom 16 of reactor 10 and merges with rise tube 12 at junction 18. Eductor 20, disposed at junction 18, is coupled at junction 22, through lines 24 and 26, to oil source 28 and hydrogen source 30. Eductor 20, extending into tube 12, injects a high-velocity stream of oil and hydrogen into reactor 10 via tube 12.

Contained within the reactor 10 is ebullating bed 32. This bed is a reacting, agitated mass comprising oil, hydrogen, and hydrocracking catalyst. The catalysts and the conditions within the reactor are well known, and examples of typical catalysts and conditions are illustrated in the following U.S. Pat. Nos. 2,987,465; 2,987,467; 3,050,459; 3,151,060; Re. 25,770; 3,183,180; 3,281,352 and 3,322,665.

As hydrocracking occurs within reactor 10, oil feed, heated in furnace 34, flows along line 24 into eductor 20. Simultaneously, hydrogen, heated in furnace 35 and pressurized in compressor 36, flows along line 26 into eductor 20. Eductor 20 feeds the oil and hydrogen into tube 12, in which they are mixed and forced to flow upwardly into the lower section of bed 32. The effluent from tube 12 impinges against baffle 40 within reactor 10, and this baffle distributes the effluent so that it does not disturb the upper section of bed 32. Simultaneously, dense reacting material from bed 32, including catalyst, flows downwardly through standpipe 14 to junction 18 where it is educted into the oil-hydrogen stream in tube 12. This stream has a high velocity relative to the velocity of the reacting material within bed 32, and tube 12 is sufficiently long so that the oil and catalyst in the stream make good contact for an extended period. The greater the velocity and throughput, the better the overall mixing of catalyst and oil. This turbulent stream recirculates the catalyst, promoting mixing, and it tends to remove 'stagnant oil' from the catalyst's surface, prolonging catalyst life.

Gaseous products leave the reactor 10 via line 50, are cooled, and flow into high-pressure separator 52 which separates the hydrocarbons from unused hydrogen. Lower molecular weight hydrocarbons flow from separator 52 via line 54, and hydrogen via line 56. The hydrogen passes into absorber 58 which removes hydrogen sulfide and ammonia contaminants, as well as gaseous hydrocarbons, from the hydrogen recycle stream. Valve 60 is closed and valve 62 is opened, allowing the hydrogen stream to flow via line 64 into compressor 66. This compressor 66 feeds the recycle hydrogen through line 70, into bottom 16 of reactor 10.

Liquid products 41 free of catalyst form a pool near top 42 of reactor 10. These liquid products 41 are withdrawn via line 44, and pump 46 recycles these liquid products via line 47 into line 70 where they are mixed with recycled hydrogen. When valve 48 is open products 41 are also blended with fresh oil feed.

Line 73 connects lines 26 and 70, and valve 72 in line 73 is used to control the operation of eductor 20. When valve 72 is closed, maximum velocity of the stream in tube 12 is attained. As valve 72 is opened incrementally, the velocity of the stream in tube 12 decreases.

I claim:

1. A hydrocracking process for making lower molecular weight hydrocarbons from a higher molecular weight hydrocarbon oil feed, comprising the steps of:
   a. establishing within a reaction zone an ebullating bed of hydrogen, hydrocracking catalyst, and oil feed, said bed being maintained at conditions which promote the formation of said lower molecular weight hydrocarbons;
   b. withdrawing from and returning to said zone a portion of the catalyst as a confined stream, said catalyst having thereon a stagnant film of oil;
   c. mixing said withdrawn catalyst with a high-velocity stream of hydrogen and oil feed flowing into the zone by injection into said confined stream, said high-velocity stream having a velocity of from about 10 to about 100 times greater than the average velocity of the material in the ebullating bed, and whereby said stagnant film of oil is removed from the catalyst surface;
   d. withdrawing from said zone the lower molecular weight hydrocarbons.

2. The process defined in claim 1 wherein the confined stream is directed into or near the lower portion of the reaction zone.

3. The process defined in claim 1 wherein the confined stream is dispersed as it enters said reaction zone in a manner which does not unduly disturb the ebullating bed.

4. A hydrocracking process for making lower molecular weight hydrocarbons from a higher molecular weight hydrocarbon oil feed, comprising the steps of:
  a. establishing within a vertical reactor an ebullating bed of hydrogen, hydrocracking catalyst, and oil feed, said bed being maintained at conditions which promote the formation of said lower-molecular weight hydrocarbons;
  b. withdrawing catalyst from an intermediate part of the bed as a confined stream;
  c. mixing said withdrawn catalyst with a vertical, upwardly flowing, high-velocity stream of hydrogen and oil feed injected into said confined stream which goes into the lower portion of the reactor, said high-velocity stream flowing at a velocity of from about 10 to about 100 times greater than the average velocity of material in the ebullating bed;
  d. dispersing said confined stream as it is injected into said bed in a manner which does not unduly disturb said bed; and
  e. withdrawing from the upper portion of the reactor low-molecular weight hydrocarbons.

* * * * *